H. H. STONER.
TIRE CHAIN CLAMP.
APPLICATION FILED AUG. 8, 1918.
1,301,521.
Patented Apr. 22, 1919.
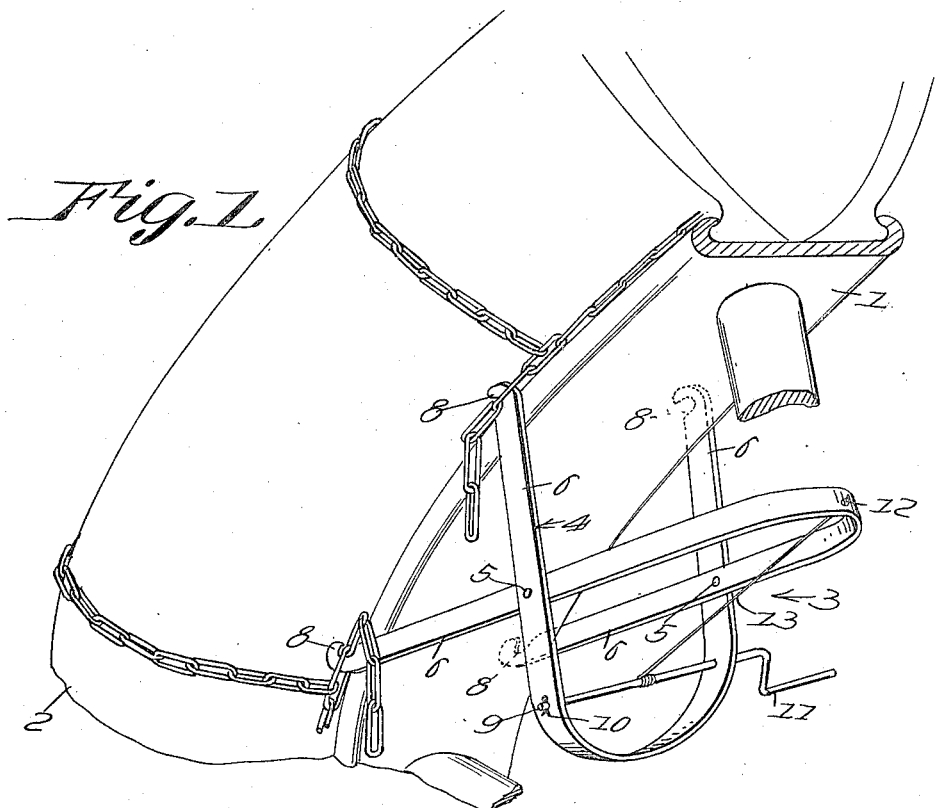
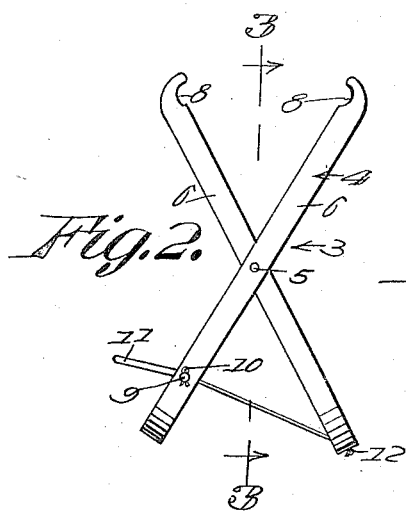
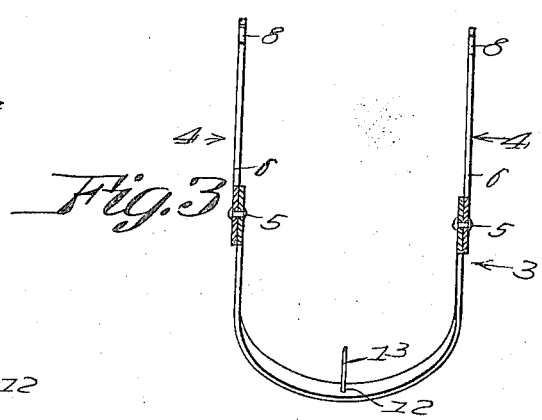
Inventor
Harvey H. Stoner,
By
V. Hume Talbert
Attorney

UNITED STATES PATENT OFFICE.

HARVEY H. STONER, OF SPRINGFIELD, OHIO, ASSIGNOR OF ONE-HALF TO WILLIS D. STONER, OF SPRINGFIELD, OHIO.

TIRE-CHAIN CLAMP.

1,301,521.   Specification of Letters Patent.   Patented Apr. 22, 1919.

Application filed August 8, 1918. Serial No. 248,889.

*To all whom it may concern:*

Be it known that I, HARVEY H. STONER, citizen of the United States of America, residing at Springfield, in the county of Clark and State of Ohio, have invented new and useful Improvements in Tire-Chain Clamps, of which the following is a specification.

The invention is designed to provide a neat and efficient tire clamp by means of which operation the placing of skid chains upon auto vehicle tires may be greatly facilitated.

It is further designed to provide a device of this character which is comparatively simple in construction, durable in operation and inexpensive to manufacture.

To the exact construction to which it is shown and described the invention is not to be restricted. The right is reserved to make such changes or alterations as the actual reduction to practice may demand, in so far as such changes or alterations are comprehended in spirit by the annexed claims.

In the accompanying drawings:

Figure 1 is a perspective view showing the practical application of the invention.

Fig. 2 is a plan view of the clamping member.

Fig. 3 is a section on the line 3—3 of Fig. 2.

Referring to the drawings, there is shown a portion 1 of a demountable rim constructed in the usual manner for carrying the usual clencher tire, a section 2 of which is shown.

The clamp to facilitate the attachment to the tire of a skid chain comprises two U-shaped members 3 and 4 which are pivotally connected together by means of pins 5 which are passed through adjacent legs 6 at intermediate points in the legs. Each of the legs 6 at its free end is cut out, as shown, to provide the hook 8, the hooks on one U-shaped member opposing those on the other.

The U-shaped member 4 carries a shaft or staff 9 which is journaled in its legs 6 at points adjacent the points of connection of the legs with the transverse portion of the said U-shaped member. This staff is mounted for angular movement but is precluded from longitudinal movement by the pins 10 which are inserted transversely through the shaft on the outside of one of the legs 6. The shaft 9 is formed with a crank 11 to permit the shaft being turned by hand. At an intermediate point on the transverse portion of the U-shaped member 3, a hole 12 is formed and in this hole is attached one end of a cable 13, the other end of the said cable being fixed to the shaft 9. It will thus be observed that the turning of the shaft operates to wind the cable on the shaft, this operation resulting in drawing the two U-shaped members into positions approaching parallelism and thereby moving the opposed hooks 8 toward each other.

In the operation of placing a skid chain on the tire the opposed hooks 8 are made to engage the links of opposite ends of the chain, when the turning of the crank as before stated will result in moving the hooks 8 toward each other when the chain ends will be drawn together for attachment to each other.

From the foregoing description and the accompanying drawings, it is thought that the construction and operation of the invention have been made clearly apparent and a further description is, therefore, omitted.

The invention having been described what is claimed as new and useful is:—

1. A tire clamp comprising a pair of U-shaped members pivotally connected together at intermediate points on their legs, each U-shaped member having hooks formed at the ends of its legs and in an opposed position to the hooks on the legs of the other member, and means for rocking the U-shaped members on their pivotal connection so that the hooks of the former may effect a clamping operation on the ends of a skid chain to attach the same on a vehicle tire.

2. A tire clamp comprising a pair of U-shaped members pivotally connected together at intermediate points on their legs, each U-shaped member having hooks formed at the ends of its legs and in an opposed position to the hooks on the legs of the other member, a staff journaled in one U-shaped member near the transverse portion of the latter, the shaft having a crank formed therewith, and a cable one end of which is connected to the transverse portion of the other U-shaped member and the remaining end connected to the shaft, whereby the turning of the crank will operate to move the hooked ends of the U-shaped members toward each other for the useful purpose specified.

In testimony whereof I affix my signature.

HARVEY H. STONER.